United States Patent
Folmar et al.

(10) Patent No.: US 8,244,497 B2
(45) Date of Patent: Aug. 14, 2012

(54) METHOD OF SOLVING A PROCESS FUNCTION FOR MANUFACTURING AN EXTRUSION DIE

(75) Inventors: David William Folmar, Campbell, NY (US); Mark Lee Humphrey, Elmira, NY (US); Shane David Seyler, Corning, NY (US)

(73) Assignee: Corning Incorporated, Corning, NY (US)

( * ) Notice: Subject to any disclaimer, the term of this patent is extended or adjusted under 35 U.S.C. 154(b) by 375 days.

(21) Appl. No.: 12/474,732

(22) Filed: May 29, 2009

(65) Prior Publication Data

US 2010/0305900 A1   Dec. 2, 2010

(51) Int. Cl.
*B23K 9/00* (2006.01)
*G01B 5/02* (2006.01)

(52) U.S. Cl. ..................... 702/170; 219/69.11

(58) Field of Classification Search ............. 264/177.11; 425/464; 702/155, 158, 170; 219/69.11, 219/69.15, 69.16, 69.17

See application file for complete search history.

(56) References Cited

U.S. PATENT DOCUMENTS

| | | | |
|---|---|---|---|
| 5,487,863 A * | 1/1996 | Cunningham et al. ... | 264/177.11 |
| 5,919,380 A * | 7/1999 | Magara et al. ............. | 219/69.16 |
| 6,570,119 B2 | 5/2003 | Marcher | |
| 6,600,125 B1 | 7/2003 | Boccadoro et al. | |
| 7,238,217 B2 | 7/2007 | Cutler et al. | |
| 2004/0161583 A1* | 8/2004 | Brew et al. .................... | 428/116 |
| 2006/0034972 A1* | 2/2006 | Takahashi et al. ............ | 425/462 |
| 2006/0178769 A1* | 8/2006 | Brew et al. .................... | 700/122 |
| 2008/0223828 A1* | 9/2008 | Forenz et al. ............. | 219/69.15 |
| 2009/0218322 A1* | 9/2009 | Folmar et al. ............. | 219/69.17 |

* cited by examiner

*Primary Examiner* — Michael Nghiem
*Assistant Examiner* — Manuel Rivera Vargas
(74) *Attorney, Agent, or Firm* — Matthew B. McNutt

(57) ABSTRACT

Methods are provided for solving a process function for modification of a non-test die for use in extrusion of a honeycomb body. The process function is solved by comparing measured widths of a plurality of slots between pins of a test die in the post-removal state and measured widths of a plurality of slots between pins of the test die in the pre-removal state. Methods are also provided for modifying a non-test die for use in extrusion of a honeycomb body. Such methods remove non-test-die material from a plurality of pins of the non-test die based on application of the process function.

21 Claims, 6 Drawing Sheets

US 8,244,497 B2

METHOD OF SOLVING A PROCESS FUNCTION FOR MANUFACTURING AN EXTRUSION DIE

FIELD

The present disclosure relates generally to methods of solving a process function, and more particularly, to methods of solving a process function for modification of a non-test die for use in extrusion of a honeycomb body.

BACKGROUND

Conventional methods for modifying dies for extrusion of honeycomb bodies include plunge electrical discharge machining of the dies by use of a tool electrode. Such conventional methods are known to provide an extrusion die configured to produce a honeycomb body with cell walls that increase in width with increasing proximity to the outer periphery of the honeycomb body.

SUMMARY

In one example aspect, a method is provided for solving a process function for modification of a non-test die for use in extrusion of a honeycomb body. The method comprises the steps of measuring widths of a plurality of slots between pins of a test die in a pre-removal state, and removing test-die material from a plurality of the pins of the test die in the pre-removal state to obtain a plurality of pins of the test die in a post-removal state. The method further includes the steps of measuring widths of a plurality of slots between pins of the test die in the post-removal state, and solving the process function based on comparison between the measured widths of the plurality of slots between pins of the test die in the post-removal state and the measured widths of the plurality of slots between pins of the test die in the pre-removal state.

In another example aspect, a method is provided for modifying a non-test die for use in extrusion of a honeycomb body. The method comprises the steps of measuring widths of a plurality of slots between pins of a test die in a pre-removal state, and removing test-die material from a plurality of the pins of the test die in the pre-removal state to obtain a plurality of pins of the test die in a post-removal state. The method further includes the steps of measuring widths of the plurality of slots between pins of the test die in the post-removal state, and solving a process function. The step of solving the process function is based on comparison between the measured widths of the plurality of slots between pins of the test die in the post-removal state and the measured widths of the plurality of slots between pins of the test die in the pre-removal state. The method further includes the step of removing non-test-die material from a plurality of pins of the non-test die based on application of the process function.

BRIEF DESCRIPTION OF THE DRAWINGS

These and other features, aspects and advantages of the present disclosure are better understood when the following detailed description is read with reference to the accompanying drawings, all of which are schematic or in the form of a flow chart, in which.

DETAILED DESCRIPTION

Figure 1:
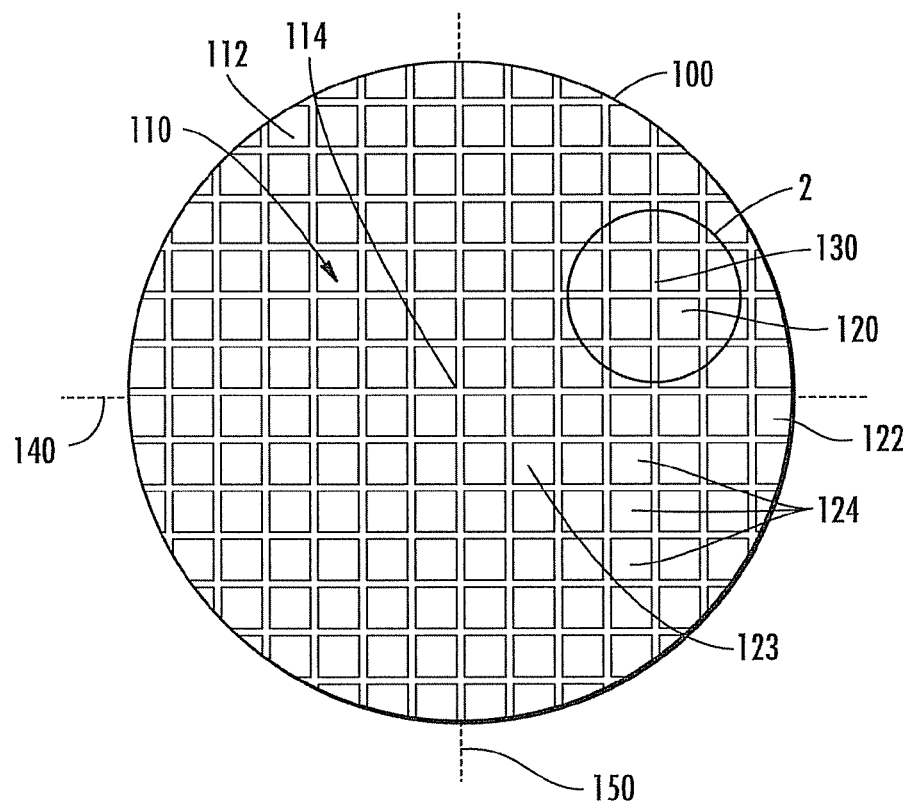
FIG. 1 is a top view of a test die in a pre-removal state.

The present disclosure will now be described more fully hereinafter with reference to the accompanying drawings in which example embodiments of the invention are shown. Whenever possible, the same reference numerals are used throughout the drawings to refer to the same or like parts. However, this invention may be embodied in many different forms and should not be construed as limited to the embodiments set forth herein. These example embodiments are provided so that this disclosure will be both thorough and complete, and will fully convey the scope of the invention to those skilled in the art.

As set forth in the figures, example methods are provided for solving a process function for modification of a non-test die for use in extrusion of a honeycomb body and for modifying a non-test die for use in extrusion of a honeycomb body. The methods provide advantages, including, for example, increased precision regarding modifying a die for extrusion of a honeycomb body and controlling the relative thicknesses of various portions of a honeycomb body extruded from such a die. The increased precision can be used, for example, to obtain a honeycomb body with improved strength and/or thermal transfer properties.

As used herein, the term honeycomb body includes any kind of structure defining a network of cells, whatever the geometry of the cells may be. For example, the cells may have a square or other polygonal shape. The cells can also have a circular, oval or other curvilinear shape. A honeycomb body can comprise one or more of various materials, including a ceramic material. Production of a honeycomb body can be accomplished by forming a batch by combining and mixing raw materials such as inorganic materials, a liquid vehicle, and a binder, introducing the batch into a die, and extruding the batch from the die, among other steps, to obtain a honeycomb body. Honeycomb bodies can be used in various filtering applications, including, for example, as a particulate filter for processing exhaust from a combustion engine.

As used herein, the term die includes devices that can be used directly or indirectly for honeycomb extrusion. Example dies can take the form of a test die or a non-test die. The test die can be used indirectly for honeycomb extrusion by enabling a process function to be solved based on removal of test-die material, in accordance with methods described below. A non-test die can be used to directly form a honeycomb extrusion after non-test die material has been removed based on use of a solved process function, also in accordance methods described below. A die, such as a test die or a non-test die, can be provided in a pre-removal state or a post-removal state. A pre-removal state refers to a die prior to removal of die material while a post-removal state refers to a die subsequent to removal of die material.

Test dies or non-test dies, whether in a pre-removal state or a post-removal state, can include various features, such as feedholes, an outlet face, slots, and pins. Feedholes can permit introduction of batch material into the die. The outlet face can include the face of the die from which material for extrusion may be discharged and thus from which the honeycomb body forms during extrusion. The slots can comprise voids in the die from which material for extrusion can be extruded from the die. The slots may be located at, and distributed across, the outlet face and are in fluid communication with the feedholes. The pins can include solid portions of the die that may be considered to define the slots. The die pins can be distributed across the outlet face and arranged to help shape batch material being extruded through the slots. The die can also be configured to form a skin along the periphery of the honeycomb body. For example, the die can be configured to receive a mask to help define the skin as the batch material is extruded through the die.

Considering the features of an example die in more detail, FIG. 1 provides a schematic illustration of one example test die 100 for illustration purposes. The illustrated example test die 100 of FIG. 1 is presented in a pre-removal state. The top view illustrates example pins 120 and slots 130 along an outer face 110 of the test die 100. As shown, the outlet face 110 of the test die 100 can have a circular periphery although other curvilinear, polygonal or other shapes may be used in further examples. As also shown, a plurality of the pins 120 of the test die 100 in the pre-removal state can be square and can have substantially uniform dimensions with respect to each other. Alternatively, the pins 120 can have other shapes such as curvilinear (e.g., circular, oval), polygonal (e.g., triangular, other rectangular shapes, polygonal shapes with greater than 4 sides, etc), or other shapes. Moreover, the dimensions of the pins 120 can be non-uniform with respect to each other. For example, one or a plurality of pins may have different dimensions when compared to another pin or plurality of pins. As further shown, pins 122 adjacent to the outer periphery 112 of the outlet face 110 can have shapes and dimensions that are defined by the outer periphery 112, independent of the shapes and dimensions of the pins 123 that are not adjacent to the outer periphery 112. As still further shown, the pins 120 can be distributed in even rows along a horizontal axis 140 and a vertical axis 150 of the outlet face 110, and can be distributed along a given row uniformly with respect to the distances between the centers 124 of the pins 120 in the row. Alternatively, the pins 120 can be distributed in various other manners, such as in uneven rows or randomly, and/or non-uniformly across a given row. And as still further shown, the slots 130 can occur in the form of a uniform grid at the outlet face. This can occur specifically if the pins 123 that are not adjacent to the outer periphery 112 of the outlet face 110 are square shaped when viewed from above, have uniform dimensions with respect to each other, are distributed evenly in rows along horizontal axis 140 and vertical axis 150 of the outlet face 110, and are distributed at uniform distances with respect to the centers 124 of the pins 120 along each given row. Alternatively, the slots 130 can occur in various other forms such as non-uniform grids or as non-grids.

Figure 2:
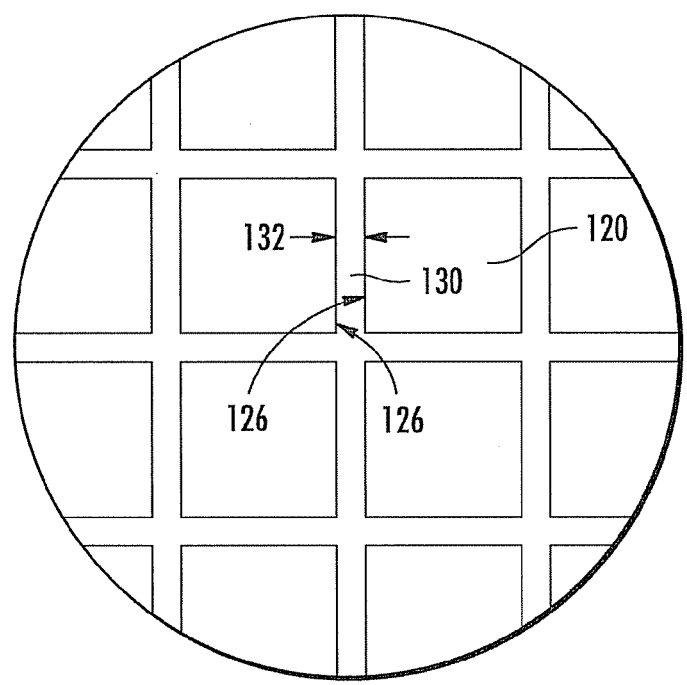
FIG. 2 is an enlarged top view corresponding to the circle labeled 2 of FIG. 1.

Considering the shape and dimensions of slots 130 of a test die 100 in a pre-removal state in more detail, FIG. 2 provides an enlarged schematic illustration of a plurality of the pins 120 and the slots 130 of a test die 100. FIG. 2 particularly illustrates that the width 132 of a slot 130 is determined by the distance between the opposing faces 126 of the pair of pins 120 on opposite sides of the slot 130.

Figure 3:
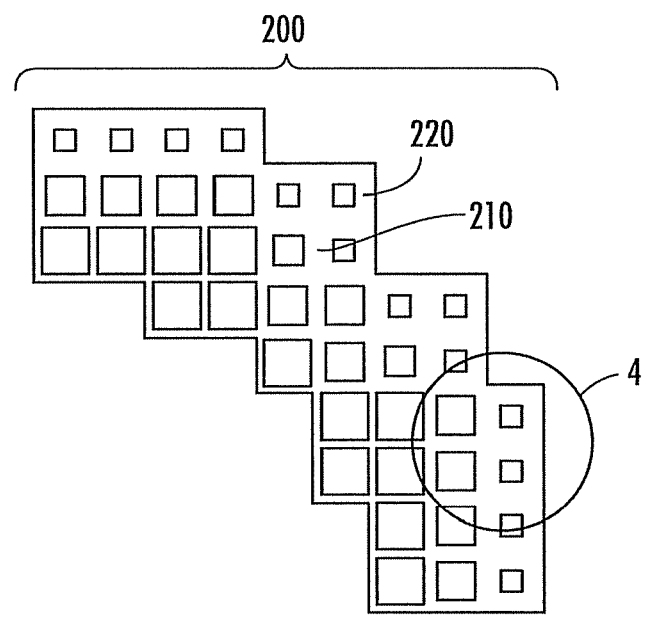
FIG. 3 is a top view of an electrode, including web portions that are illustrated in a disproportionately wide manner for ease of viewing.

Turning now to removal of material from a die, FIG. 3 is a schematic illustration of an electrode 200, which is an example of a tool that can be used to remove material from a die, including a test die or a non-test die. More specifically, FIG. 3, with reference to FIG. 1, is a schematic illustration of an electrode 200 for use in modification of a test die 100. Of note, as used herein, the terms electrode and first electrode are used interchangeably to refer to an electrode 200 for use in modification of a test die, whereas the term second electrode is used to refer to an electrode for modification of a non-test die. As shown, the electrode 200 can have a plurality of web portions 210 and an outer periphery 220. As also shown, the web portions 210 are illustrated in a disproportionately wide manner for ease of viewing.

Figure 4:
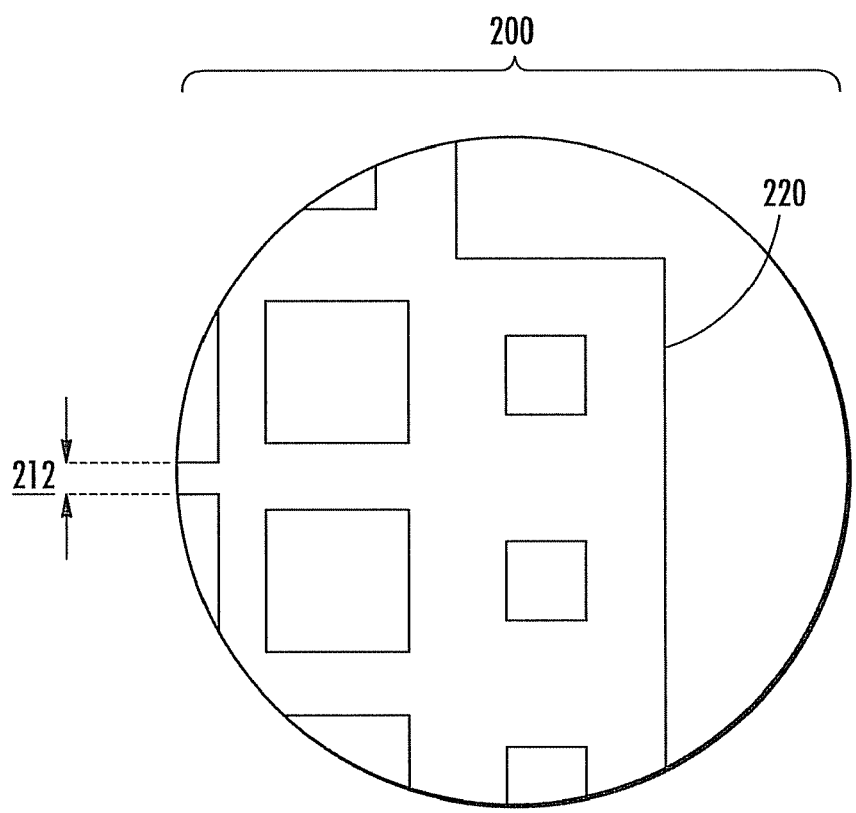
FIG. 4 is an enlarged top view corresponding to the circle labeled 4 of FIG. 3.

Considering an electrode 200 for modification of a test die in more detail, FIG. 4 provides an enlarged schematic illustration of a plurality of web portions 210 of the electrode 200. Taken together, FIGS. 3 and 4 illustrate that the web portions 210 can have widths 212 that are non-uniform with respect to each other. For example, as shown, the widths 212 of web portions 210 can increase with increasing proximity to the outer periphery 220 of the electrode 200. Alternatively, for example, the widths 212 of web portion 210 can decrease with increasing proximity to the outer periphery 220 of the electrode 200 or can vary randomly across the electrode 200. Also alternatively, the widths 212 of web portions 210 can be uniform with respect to each other. Moreover, as shown, the width 212 of any particular web portion 210 can be uniform along the length of the web portion 210. Alternatively, the width 212 of a web portion 210 can vary along the length of the web portion 210.

Figure 5:
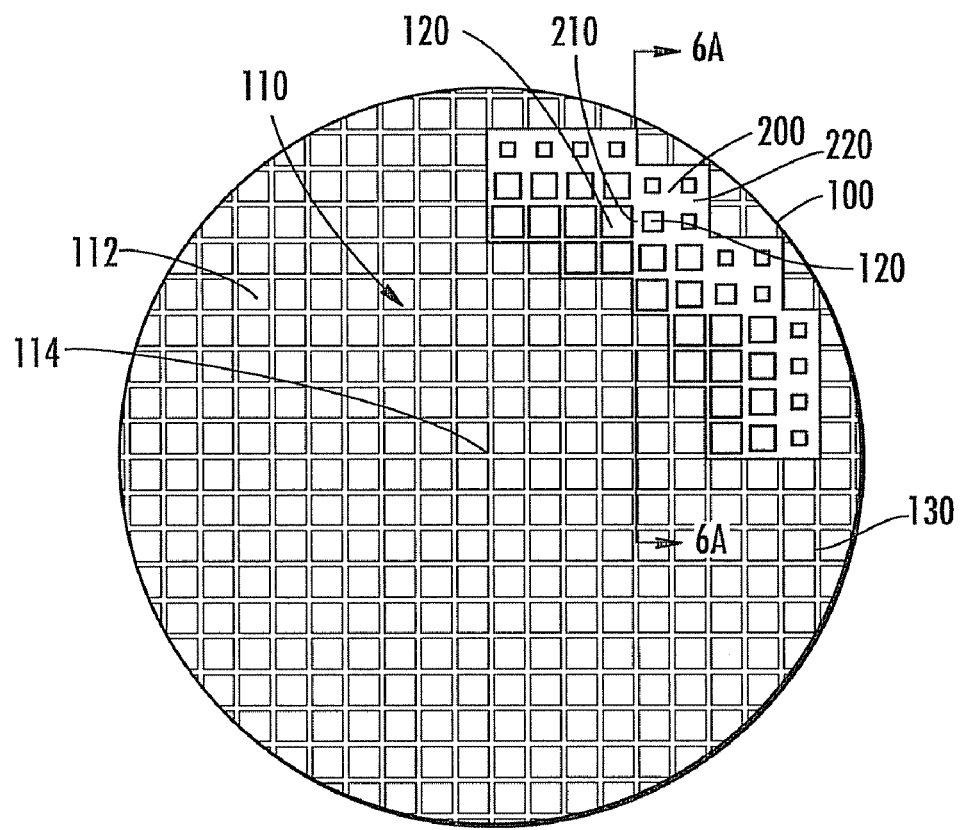
FIG. 5 is a top view of a test die in a pre-removal state and an electrode positioned with respect to the slots between pins of the test die, the electrode including web portions that are illustrated in a disproportionately wide manner for ease of viewing.

Considering an electrode 200 in relation to a test die 100, FIG. 5 illustrates schematically an electrode 200 positioned with respect to a plurality of slots 130 of a test die 100. As shown, the electrode 200 can have web portions 210. As also shown, the web portions 210 are illustrated in a disproportionately wide manner relative to the slots 130 for ease of viewing. The electrode 200 can have web portions 210 that are narrower than, and thus complementary to, slots 130 of a test die 100, such that the electrode 200 can be positioned within the slots 130. For example, the electrode 200 can have web portions 210 that are narrower than, and complementary to, slots 130 that form a uniform grid. Alternatively, the electrode 200 can have web portions 210 that are narrower than, and complementary to, slots 130 that form a non-uniform grid or a non-grid. Moreover, where the electrode 200 has web portions 210 that are narrower than, and complementary to, slots 130 that form a uniform grid, the electrode 200 can form a non-uniform grid, for example such that a plurality of web portions 210 of the electrode 200 vary in their dimensions relative to each other, for example in terms of their lengths and widths. Alternatively, the electrode 200 can form a uniform grid. As shown, the electrode 200 itself can be complementary to a plurality of slots 130 distributed across less than the whole of the outlet face 110 of the test die 100, specifically to a plurality of slots 130 located in a quadrant of the outlet face 110 of the test die 100 and adjacent to the outer periphery 112 of the outlet face 110. Alternatively, the electrode 200 can be complementary, for example, to a plurality of slots 130 located in a quadrant of the outlet face 110 of the test die 100 and adjacent to the center 114 of the outlet face 110, to a plurality of slots 130 located in a quadrant of the outlet face 110 of the test die 100 and intermediate between the center 114 and the outer periphery 112 of the outlet face 110, or to a plurality of slots 130 located in a half, a third, a fifth, or a sixth of the outlet face 110. Also alternatively, the electrode 200 can be complementary to slots 130 distributed across the entirety of the outlet face 110 of the test die 100.

Figure 6A:
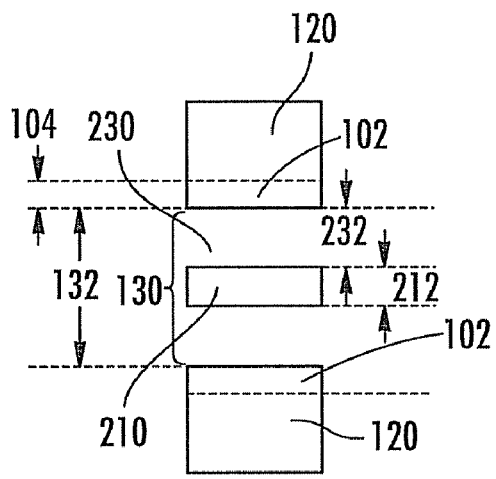
FIG. 6A is a partial sectional view along line 6A-6A of FIG. 5, prior to removal of material.

Methods will now be described for solving a process function for modification of a non-test die for use in extrusion of a honeycomb body. As shown in FIG. 6A, with reference to FIGS. 1 and 2, the method can include a step of measuring widths 132 of a plurality of slots 130 between pins 120 of a test die 100 in a pre-removal state. The measuring step can be based, for example, on use of an image-analysis-grand-average approach to measure the widths 132 of the slots 130 prior to removal of test-die material 102. Alternatively, the measuring step can be based on use of mechanical gauges, pin gauges, or other techniques. As shown in FIGS. 1 and 2, the step can include, for example, measuring the widths 132 of a plurality of slots 130 in each of four quadrants of an outlet face 110 that has a circular outer periphery 112. In one example, the widths 132 of five slots 130 are measured in a row formed by five pairs of pins 120 in each of the quadrants, the five slots 130 and the five pairs of pins 120 in each quadrant being situated symmetrically relative to each other. Alternatively, the step can include measuring the widths of more or fewer slots. In additional examples, the step can include measuring slots 130 that are located in more than one row, such as, for example, two or more rows, or measuring slots 130 that are not located in a row. Further still alternatively, the step can include measuring slots 130 that are located in fewer than four quadrants, such as, for example, three quadrants, two quadrants, one quadrant. In still further examples, the step can include measuring slots that are found in one or more partial quadrants or areas not corresponding to quadrants, such as, for example, a half, a third, a fifth, or a sixth of the area of the outlet face, or across some other partial or entire surface of the outlet face 110 of the test die 100. The step can also include measuring slots that are located adjacent to the outer periphery 112 of the outlet face 110 of the test die 100. Alternatively, the step can include measuring slots that are adjacent to the center 114 of the outlet face 110 or between the center 114 and the outer periphery 112 of the outlet face 110.

Figure 6B:
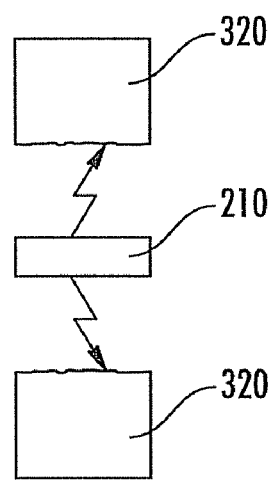
FIG. 6B is the partial sectional view of FIG. 6A indicating removal of test-die material.
Figure 7:
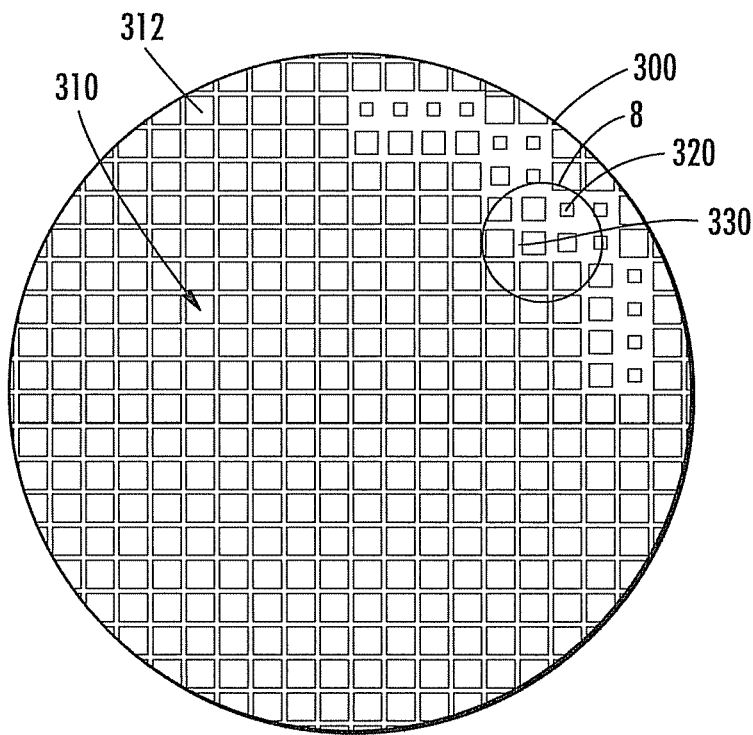
FIG. 7 is a top view of a test die in a post-removal state.

Turning to FIGS. 5, 6A, 6B, and 7, the method can also include a step of removing test-die material 102 from a plurality of pins 120 of the test die 100 in the pre-removal state to obtain a plurality of pins 320 of the test die 300 in a post-removal state. The step of removing test-die material 102 can be accomplished, for example, by electrical discharge machining (EDM) such as plunge EDM. Alternatively, the test-die material 102 can be removed by electrochemical machining, hydraulic machining, and/or other machining techniques. FIGS. 6A and 6B, with reference to FIGS. 5 and 7, schematically illustrate a plunge EDM process being applied to the test die 100. As shown in FIG. 6A, an electrode 200 can be brought in close proximity to a plurality of pins 120 of a test die 100 in a pre-removal state. Then a single or a series of rapidly recurring current discharges can be provided between the electrode 200 and the plurality of pins 120 of the test die 100. As shown in FIG. 6B, the discharges can result in removal of test-die material 102 to yield a plurality of pins 320 of the test die 300 in a post-removal state.

As illustrated schematically in FIG. 5, methods using plunge EDM can include positioning the electrode 200 with respect to the plurality of slots 130 between pins 120 of the test die 100 in the pre-removal state. As shown, the electrode 200 can be positioned, for example, between a plurality of slots 130 between pins 120 within a first quadrant of an outlet face 110 that has a circular outer periphery 112, and more particularly can be positioned adjacent to the outer periphery 112 of the outlet face 110, and can be used for plunge EDM of the pins 120. The electrode 200 can then be similarly and symmetrically repositioned within a second, third, and fourth quadrant of the outlet face 110, with the machining process being repeated with each repositioning, resulting in machining of the pins 120 of the test die 100 in a manner that is symmetrical relative to the outlet face 110. Alternatively, the machining can be accomplished by plunge EDM that is carried out in fewer than all of the quadrants of the outlet face 110, such as, for example, only one, two, or three quadrants. In further examples, the plunge EDM or other removal technique can be carried out in areas not corresponding to quadrants, such as, for example, a half, a third, a fifth, or a sixth of the area of the outlet face, or across some other partial or entire surface of the outlet face 110, depending on the complementarity of the electrode 200 to the slots 130 of the test die 100. Also alternatively, the machining can be accomplished at or adjacent the center 114 of the outlet face 110 or between the center 114 and the outer periphery 112 of the outlet face 110, again depending on the complementarity of the electrode 200 to the slots 130 of the outlet face 110.

Figure 8:
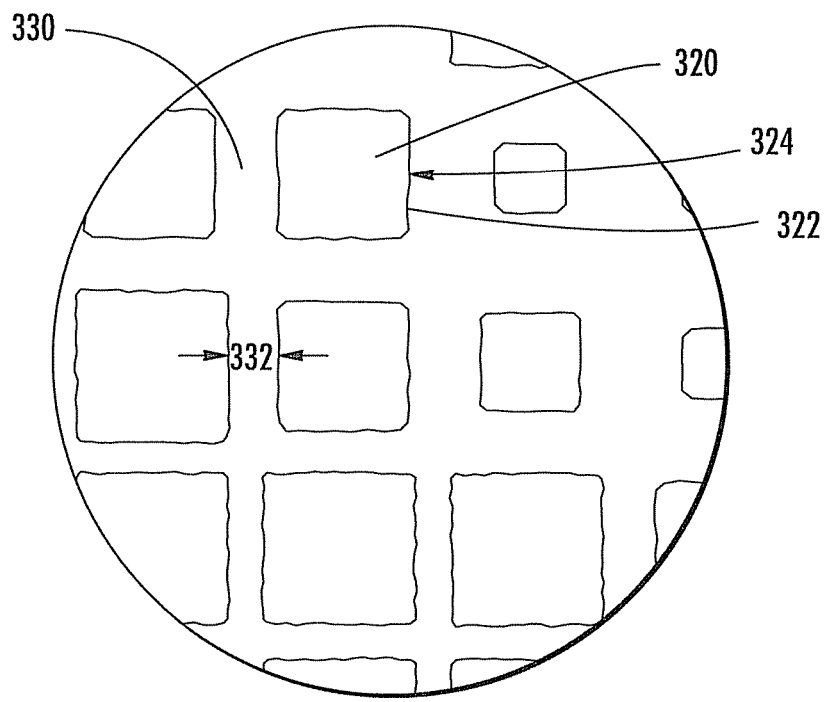
FIG. 8 is an enlarged top view corresponding to the circle labeled 8 of FIG. 7.

As illustrated schematically in FIGS. 5 and 6A, the method can include plunge EDM with an electrode 200 comprising a plurality of web portions 210 and an electrode outer periphery 220, the plurality of web portions 210 each having a width 212, the widths 212 of the plurality of the web portions 210 increasing with increasing proximity to the electrode outer periphery 220. The use of such an electrode 200 in accordance with the method can result in relatively greater removal of test-die material 102 from pins 120 of the test die 100 by web portions 210 that have relatively greater widths 212. As shown in FIGS. 7 and 8, with reference to FIGS. 5 and 6A, the result can be a test die 300 in a post-removal state that has a plurality of slots 330 that have widths 332 that increase with increasing proximity to the outer periphery 312 of the outlet face 310. A non-test die with such a slot arrangement can produce a honeycomb body with increasingly thicker walls with increasing proximity of the cells to the outer surface of the honeycomb body and may enhance the peripheral strength of the honeycomb body. Alternatively, the method can include use of an electrode 200 including a plurality of web portions 210 that have widths 212 that decrease with increasing proximity to the electrode outer periphery 220, resulting in a test die 300 in a post-removal state that has a plurality of slots 330 that have widths 332 that decrease with increasing proximity to the outer periphery 312 of the outlet face 310. Such a configuration can produce a honeycomb body with increased inner wall thicknesses, thereby increasing thermal capacity and thermal retention in the inner portions of the honeycomb body.

As illustrated schematically in FIGS. 5 and 6A, the method can include the steps of measuring widths 212 of a plurality of web portions 210 of an electrode 200 and determining widths 232 of a plurality of gaps 230 formed between the plurality of web portions 210 and the plurality of pins 120 of the test die 100 in the pre-removal state when the electrode 200 is positioned within a plurality of slots 130 between the pins 120. The measurement and the determination can be carried out, for example, by measuring the widths 212 of the plurality of web portions 210 and measuring electrode plunge alignment by imaging including use of top light illumination and optimized centroid edge analysis, as described in more detail below, along with measuring widths 132 of slots 130, as described above. Alternatively, the measurement of the widths 212 of the plurality of web portions 210 can be carried out by use of conventional optical measurement systems or pin gauges. The location of the web portion 210 relative to the two pins 120 in between which the web portion 210 is positioned can be determined based on the sum of the width 212 of the web portion 210 and the widths 232 of the gaps 230 on both sides of the web portion 210. Moreover, the measurement and the determination can include measuring the widths 212 of a plurality of web portions 210 and determining the widths 232 of a plurality of the gaps 230 in each of four quadrants of an outlet face 110 that has a circular outer periphery 112. In one example, the gaps 230 can be independently measured on either side of five slots 130 in a row formed by five pairs of pins 120 in each of the quadrants, the five slots 130 and the five pairs of pins 120 in each quadrant being situated symmetrically relative to each other. Alternatively, measurement and determination can be carried out with regard to fewer than all quadrants of the outlet face 110 of the test die 100, geometries and sections of the outlet face 110 other than quadrants, greater or fewer than five slots 130 in a row per quadrant, geometry, or section of the outlet face 110, and/or slots 130 that are not in a row.

As illustrated schematically in FIGS. 7 and 8, with reference to FIGS. 5 and 6A, the method can also include the step of measuring widths 332 of a plurality of slots 330 between pins 320 of a test die 300 in a post-removal state. As shown, removal of test-die material 102 by use of an electrode 200 that is complementary to a plurality of slots 130 between pins 120 of a test die 100 in a pre-removal state results in an increase in widths 132 of the slots 130 to yield the widths 332. As further shown, the width 332 of a slot 330 between a pair of pins 320 of the test die 300 in the post removal state can be measured. For example, measurements can be made of the widths 332 of a plurality of slots 330 between pins 320 of the test die 300 in the post-removal state in each of four quadrants of an outlet face 310 that has a circular outer periphery 312. Moreover, measurements can be made of the widths 332 of five slots 330 in a row between five pairs of pins 320 in each quadrant, the slots 330 in each quadrant being situated symmetrically relative to each other. Alternatively, measurement can be made with regard to fewer than all quadrants of the outlet face 310 of the test die 300 in a post-removal state, geometries and sections of the outlet face 310 other than quadrants, greater or fewer than five slots 330 in a row per quadrant, geometry, or section of the outlet face 310, and/or slots 330 that are not in a row.

Considering the step of measuring the widths 332 of a plurality of slots 330 between pins 320 of the test die 300 in the post-removal state in more detail, as shown in FIGS. 7 and 8, with reference to FIGS. 5 and 6A, the measuring step can include imaging. The imaging can include use of top light illumination and optimized centroid edge analysis. An example of a suitable device for such imaging is the SMART-SCOPE-QUEST-450 high-accuracy metrology system from Optical Gaging Products, Inc. (Rochester, N.Y.). The SMARTSCOPE-QUEST-450 system is designed to use a variety of sensors for full three-dimensional measurement and includes a completely telecentric and automatically calibrated 10:1 zoom lens, as well as a top light illumination feature and an optimized centroid edge analysis feature. As shown, it has been observed that removing test-die material 102 from the pins 120 of a test die 100 in a pre-removal state based on use of plunge EDM causes non-uniform surface characteristics 322 of the pins 320 of the test die 300 in the post-removal state.

Considering the measurement of the widths 332 of a plurality of slots 330 between pins 320 of the test die 300 in the post-removal state in further detail, as shown in FIGS. 7 and 8, the method can include a step of compensating for non-uniform surface characteristics 322 of the pins 320 of the test die 300 in the post-removal state. The compensating step can be based, for example, on use of an algorithm. An example of a suitable algorithm is that applied by software provided for operation and data analysis with the SMARTSCOPE-QUEST-450 system. The algorithm can compensate for the non-uniform surface characteristics to provide sufficiently accurate and precise measurements.

As shown in FIGS. 7 and 8, with reference to FIGS. 5 and 6A, the method can also include a step of solving the process function based on comparison between measured widths 332 of a plurality of slots 330 between pins 320 of a test die 300 in a post-removal state and measured widths 132 of a plurality of slots 130 between pins 120 of a test die 100 in a pre-removal state. Solving the process function can be accomplished, for example, by use of conventional statistical and/or spreadsheet software. The process function can be solved, for example, as a third order polynomial function. Alternatively, the process function can be solved as a higher order polynomial function. Moreover, the process function can be solved as a polynomial function having an R-squared value of greater than, for example, 0.85, 0.90, or 0.95.

A method can also be provided for modifying a non-test die for use in extrusion of a honeycomb body. The method can include all of the steps described above although more, fewer or different steps may be used in further examples. As shown in FIGS. 6A and 6B, with reference to FIGS. 5 and 7, the method can also include a step of plotting the process function in terms of material removal 104 versus gap width 232. For purposes of plotting the process function in terms of material removal 104 versus gap width 232, material removal 104 regarding a pin 120 of a test die 100 in a pre-removal state corresponds to an increase in width 132 of a slot 130 adjacent to the pin 120 by an amount equal to the width of test-die material 102 removed from the pin 120. Regarding plunge EDM in particular, it has been observed that material removal 104 varies proportionally with gap width 232, as opposed to, for example, varying proportionally with width 212 of a web portion 210 of an electrode 200 or width 132 of a slot 130 between pins 120 of a test die 100 in a pre-removal state. Unexpectedly, it has also been observed that various dies that vary with respect to their sizes and/or the materials from which they are made yield similar plots of the process function in terms of material removal 104 versus gap width 232. These observations indicate that a plot of material removal 104 versus gap width 232 can provide a useful tool for modification not only of dies that are similar in material and size to a test die 100 used to generate the process function, but to other dies too. For example, a plot of material removal 104 versus gap width 232 for a process function as solved for a test die 300 in a post-removal state that is of particular dimensions and that is made from stainless steel can provide a useful tool for modification not only of dies of the same dimensions and material but also of dies of other dimensions and/or materials.

Figure 9:
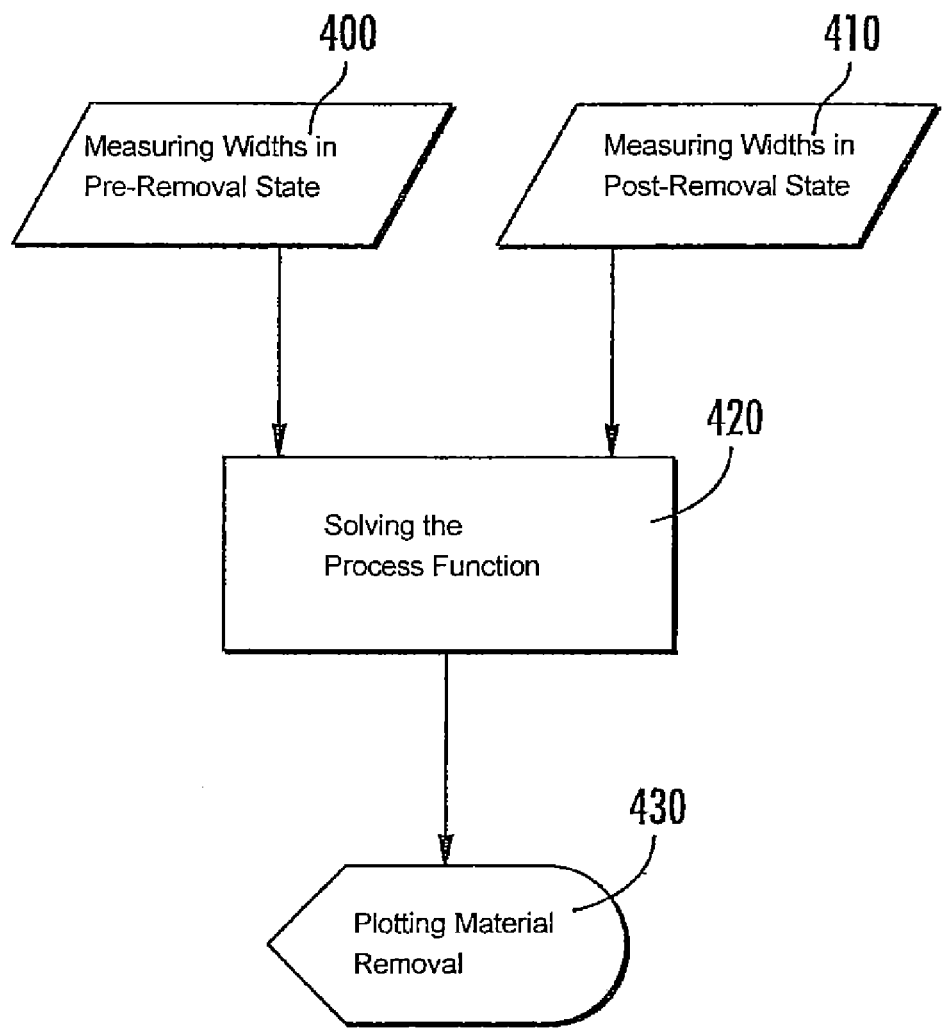
FIG. 9 is a flow chart of a method of solving and plotting a process function.

Considering the step of plotting the process function in terms of material removal 104 versus gap width 232 in more detail, FIG. 9 illustrates a flow chart for accomplishing the method, including the plotting step. As shown in FIG. 9, with reference to FIGS. 5, 6A, 7, and 8, the method can include the step 400 of measuring the widths 132 of a plurality of slots 130 between pins 120 of a test die 100 in a pre-removal state, including determining gap widths 232 between web portions 210 of an electrode 200 and the pins 120 of the test die 100. The method can further include the step 410 of measuring the widths 332 of slots 330 between pins 320 of the test die 300 in a post-removal state. The results are used as inputs for the step 420 of solving the process function. The process function is then used for the step 430 of plotting material removal 104 versus gap width 232.

Figure 10:
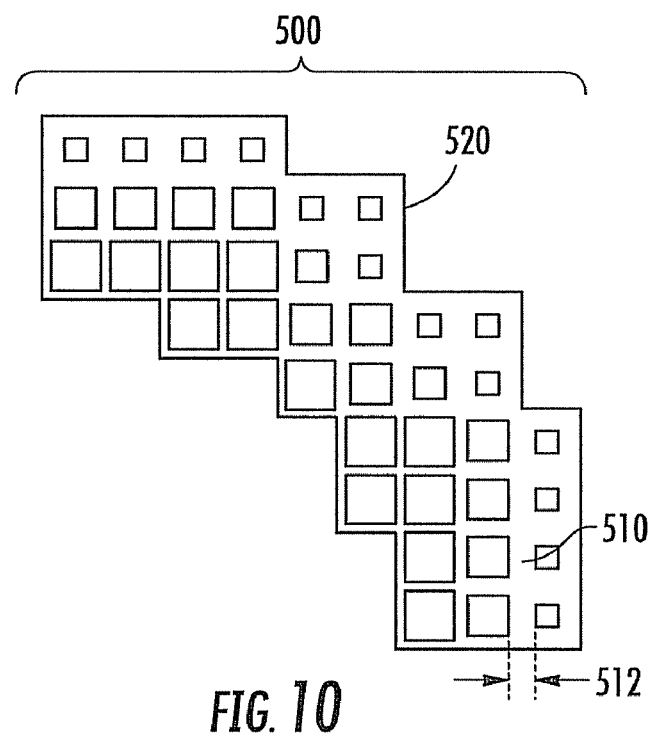
FIG. 10 is a top view of a second electrode, the electrode including web portions that are illustrated in a disproportionately wide manner for ease of viewing.
Figure 11:
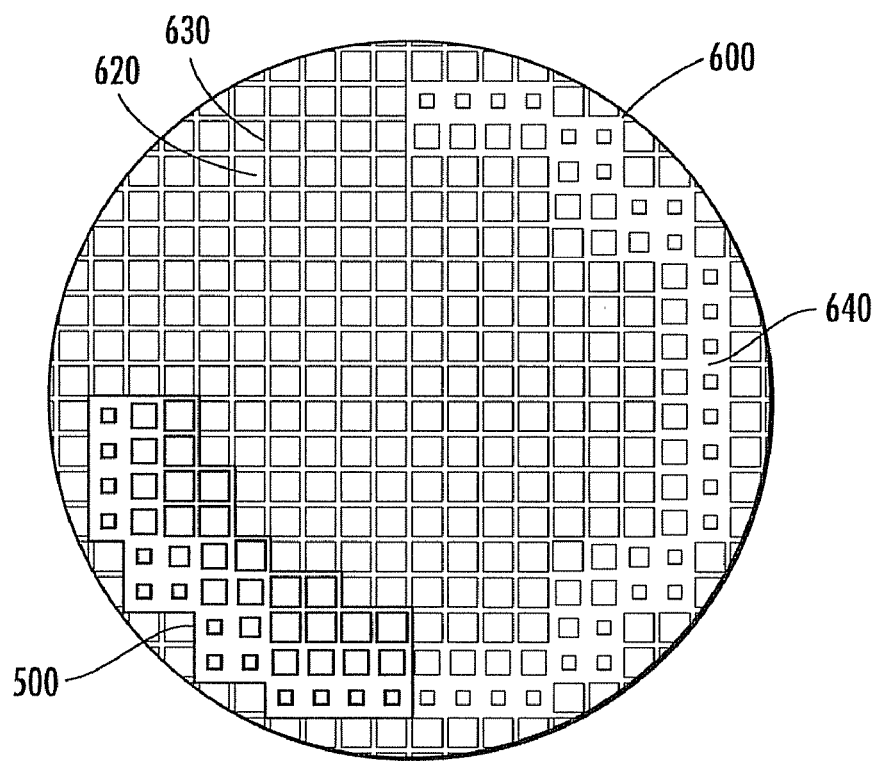
FIG. 11 is a top view of a non-test die being machined with the second electrode of FIG. 10, the second electrode including web portions that are illustrated in a disproportionately wide manner for ease of viewing.

Turning to FIGS. 10 and 11, with reference to FIGS. 5 and 6A, the method can also include a step of removing non-test die material from a plurality of pins 620 of a non-test die 600 based on application of the process function. Non-test die material can be removed from the non-test die 600, for example, by the same approaches indicated above for removal of test-die material 102 from a test die 100 in a pre-removal state, namely EDM, including plunge EDM, electrochemical discharge machining, and other removal techniques.

Considering the step of removing non-test die material from a plurality of pins 620 of the non-test die 600 in more detail, as shown FIGS. 10 and 11, the removal step can also include the steps of using the process function to design a second electrode 500 and using the second electrode 500 for EDM of the non-test die 600. As shown, the second electrode 500 can include a plurality of web portions 510. As also shown, the web portions 510 are illustrated in a disproportionately wide manner for ease of viewing. The process function can be used to determine the width 512 of a web portion 510 of the second electrode 500 that would be needed in order to provide, upon plunge EDM, a desired increase in width of a corresponding slot 630 between pins 620 of the non-test die 600. Moreover, the process function can be applied in this way to a plurality of web portions 510 of the second electrode 500, including, for example, all web portions 510 of the second electrode 500. The second electrode 500 can then be used for EDM of a plurality of pins 620 of the non-test die 600 to obtain corresponding slots 630 with desired widths. The widths of slots of a non-test die in a pre-removal state and in a post-removal state can be measured as indicated above regarding the widths of slots of a test die in a pre-removal state and in a post-removal state, respectively. The widths of the slots of the non-test die in the post-removal state can be within expected limits based on variability analysis of the material removal process.

Considering in more detail a second electrode 500, as shown in FIG. 10, the second electrode 500 can have web portions 510 having widths 512 that increase with increasing proximity to the outer periphery 520 of the second electrode 500. Alternatively, for example, the widths 512 of web portions 510 can decrease with increasing proximity to the outer periphery 520 of the second electrode 500 or can vary randomly across the second electrode 500. Also alternatively, the widths 512 of web portions 510 can be uniform with respect to each other. Moreover, as shown, the width 512 of any particular web portion 510 can be uniform along the length of the web portion 510. Alternatively, the width 512 of a web portion 510 can vary along the length of the web portion 510.

Considering in more detail a non-test die 600 that has been plunged with a second electrode 500 having web portions 510 having widths 512 that increase with increasing proximity to the outer periphery 520 of the second electrode 500, FIG. 11, with reference to FIG. 10, illustrates schematically a non-test die 600 that has been subjected to plunge EDM by such a second electrode 500 in two quadrants and which has the second electrode 500 positioned with respect to a plurality of slots 630 of a third quadrant. As indicated above, the web portions 510 are illustrated, for ease of viewing, in a disproportionately wide manner relative to the slots 630. As shown, the two quadrants can include a plurality of slots 640 in a post-removal state. Once the plunge EDM is carried out in the third quadrant, the third quadrant can also include a plurality of slots 640 in a post-removal state. Moreover, the second electrode 500 can be withdrawn and similarly used for plunge EDM of the fourth quadrant.

It will be apparent to those skilled in the art that various modifications and variations can be made to the present disclosure without departing from the spirit and scope of the invention. Thus, it is intended that the present invention cover the modifications and variations of this disclosure provided they come within the scope of the appended claims and their equivalents.

What is claimed is:

1. A method of solving a process function for modification of a non-test die for use in extrusion of a honeycomb body, the method comprising the steps of:
   measuring widths of a plurality of slots between pins of a test die in a pre-removal state;
   removing test-die material from a plurality of the pins of the test die in the pre-removal state to obtain a plurality of pins of the test die in a post-removal state;
   measuring widths of a plurality of slots between pins of the test die in the post-removal state; and
   solving the process function based on comparison between the measured widths of the plurality of slots between pins of the test die in the post-removal state and the measured widths of the plurality of slots between pins of the test die in the pre-removal state.

2. The method of claim 1, wherein the removal of test-die material is based on electrical discharge machining.

3. The method of claim 2, wherein the electrical discharge machining positions an electrode with respect to the plurality of slots between pins of the test die in the pre-removal state.

4. The method of claim 3, wherein the electrode comprises a plurality of web portions and an electrode outer periphery, the plurality of web portions each having a width, the widths of the plurality of the web portions increasing with increasing proximity to the electrode outer periphery.

5. The method of claim 3, wherein the electrode comprises a plurality of web portions, and further comprising the steps of:
   measuring widths of the plurality of web portions; and
   determining widths of a plurality of gaps formed between the plurality of web portions and the plurality of pins of the test die in the pre-removal state when the electrode is positioned with respect to the plurality of slots between pins of the test die in the pre-removal state.

6. The method of claim 1, wherein the measurement of the widths of the plurality of slots between pins of the test die in the post-removal state comprises imaging.

7. The method of claim 6, wherein the imaging comprises use of top light illumination and optimized centroid edge analysis.

8. The method of claim 1, further comprising a step of compensating for non-uniform surface characteristics of the pins of the test die in the post-removal state.

9. A method of modifying a non-test die for use in extrusion of a honeycomb body, the method comprising:
   measuring widths of a plurality of slots between pins of a test die in a pre-removal state;
   removing test-die material from a plurality of the pins of the test die in the pre-removal state to obtain a plurality of pins of the test die in a post-removal state;

measuring widths of the plurality of slots between pins of the test die in the post-removal state;

solving a process function based on comparison between the measured widths of the plurality of slots between pins of the test die in the post-removal state and the measured widths of the plurality of slots between pins of the test die in the pre-removal state; and removing non-test-die material from a plurality of pins of the non-test die based on application of the process function.

10. The method of claim 9, wherein the removal of test-die material is based on electrical discharge machining.

11. The method of claim 10, wherein the electrical discharge machining positions a first electrode with respect to the plurality of slots between pins of the test die in the pre-removal state.

12. The method of claim 11, wherein the first electrode comprises a plurality of web portions and an electrode outer periphery, the plurality of web portions each having a width, the widths of the plurality of the web portions increasing with increasing proximity to the electrode outer periphery.

13. The method of claim 11, wherein the first electrode comprises a plurality of web portions, and further comprising the steps of:

measuring widths of the plurality of web portions;

determining widths of a plurality of gaps formed between the plurality of web portions and the plurality of pins of the test die in the pre-removal state when the first electrode is positioned with respect to the plurality of slots between pins of the test die in the pre-removal state; and plotting the process function in terms of material removal versus gap width.

14. The method of claim 13, wherein the removal of non-test die material comprises:

using the process function to design a second electrode; and using the second electrode for electrical discharge machining of the non-test die.

15. The method of claim 9, wherein the measurement of the widths of the plurality of slots between pins of the test die in the post-removal state comprises imaging.

16. The method of claim 15, wherein the imaging comprises use of top light illumination and optimized centroid edge analysis.

17. The method of claim 9, further comprising a step of compensating for non-uniform surface characteristics of the pins of the test die in the post-removal state.

18. The method of claim 17, wherein the removal of test-die material is based on use of a first electrode for electrical discharge machining, and the removal of non-test die material comprises:

using the process function to design a second electrode; and using the second electrode for electrical discharge machining of the non-test die.

19. The method of claim 9, wherein the removal of non-test die material comprises:

using the process function to design an electrode; and using the electrode for electrical discharge machining of the non-test die.

20. The method of claim 19, wherein the removal of the test-die material is based on electrical discharge machining.

21. The method of claim 1, further comprising the steps of:

measuring a gap width, between the test die and an electrode for performing said removing test-die material;

said solving the process function based further on a material removal and the gap width, wherein the material removal is based on comparison of measured widths of the plurality of slots between pins of the test die in the post-removal state and the measured widths of the plurality of slots between pins of the test die in the pre-removal state; and removing non-test-die material from a plurality of pins of the non-test die based on application of the process function, wherein said removing test-die material is based on electrical discharge machining performed by the electrode.

* * * * *